Nov. 5, 1968
H. H. OLSON
3,408,877
INTERMITTENT MOTION MECHANISM
Filed Oct. 22, 1965
4 Sheets-Sheet 1
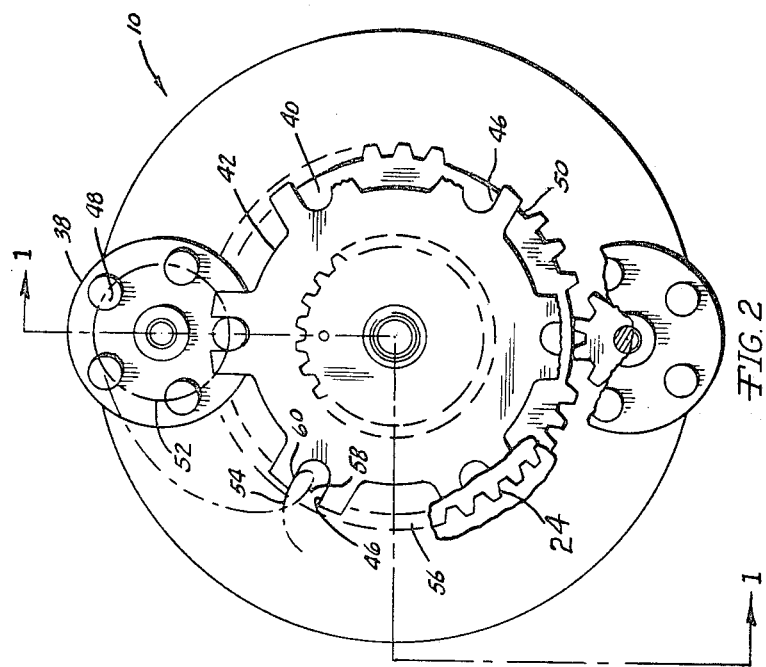
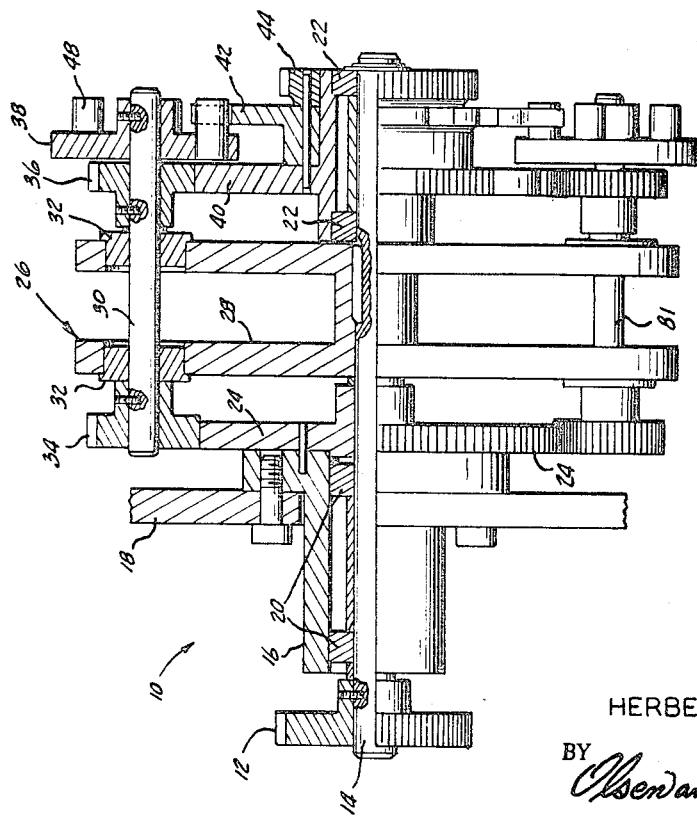
INVENTOR.
HERBERT H. OLSON
BY *Olsen and Stephenson*
ATTORNEYS INVENTOR.
HERBERT H. OLSON
BY Olsen and Stephenson
ATTORNEYS Nov. 5, 1968   H. H. OLSON   3,408,877
INTERMITTENT MOTION MECHANISM
Filed Oct. 22, 1965   4 Sheets-Sheet 3
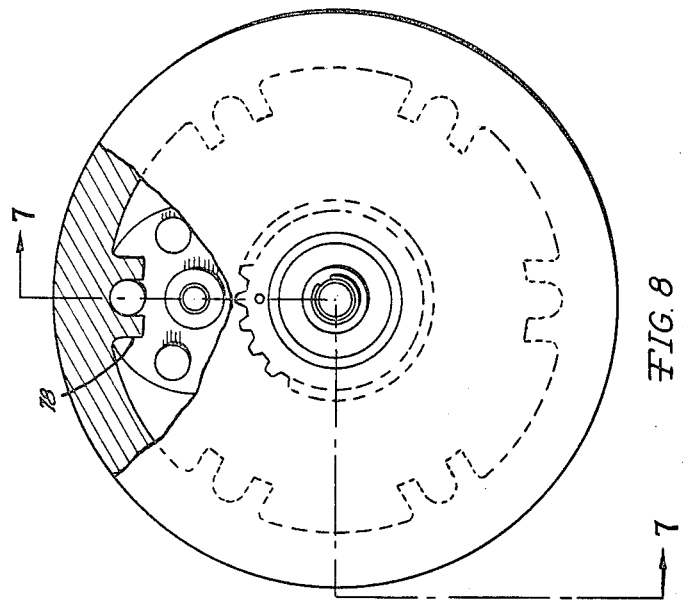
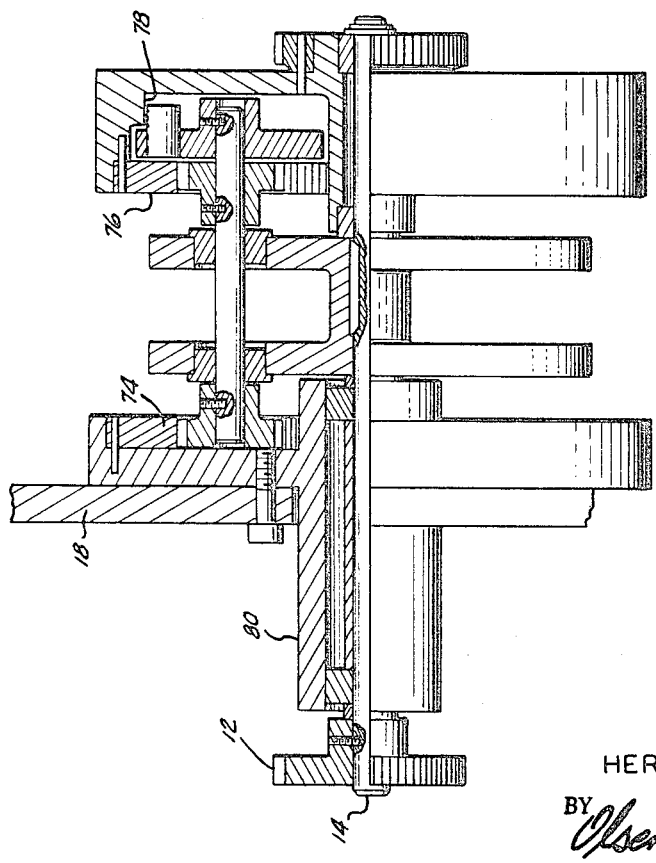
INVENTOR.
HERBERT H. OLSON
BY *Olsen and Stephenson*
ATTORNEYS

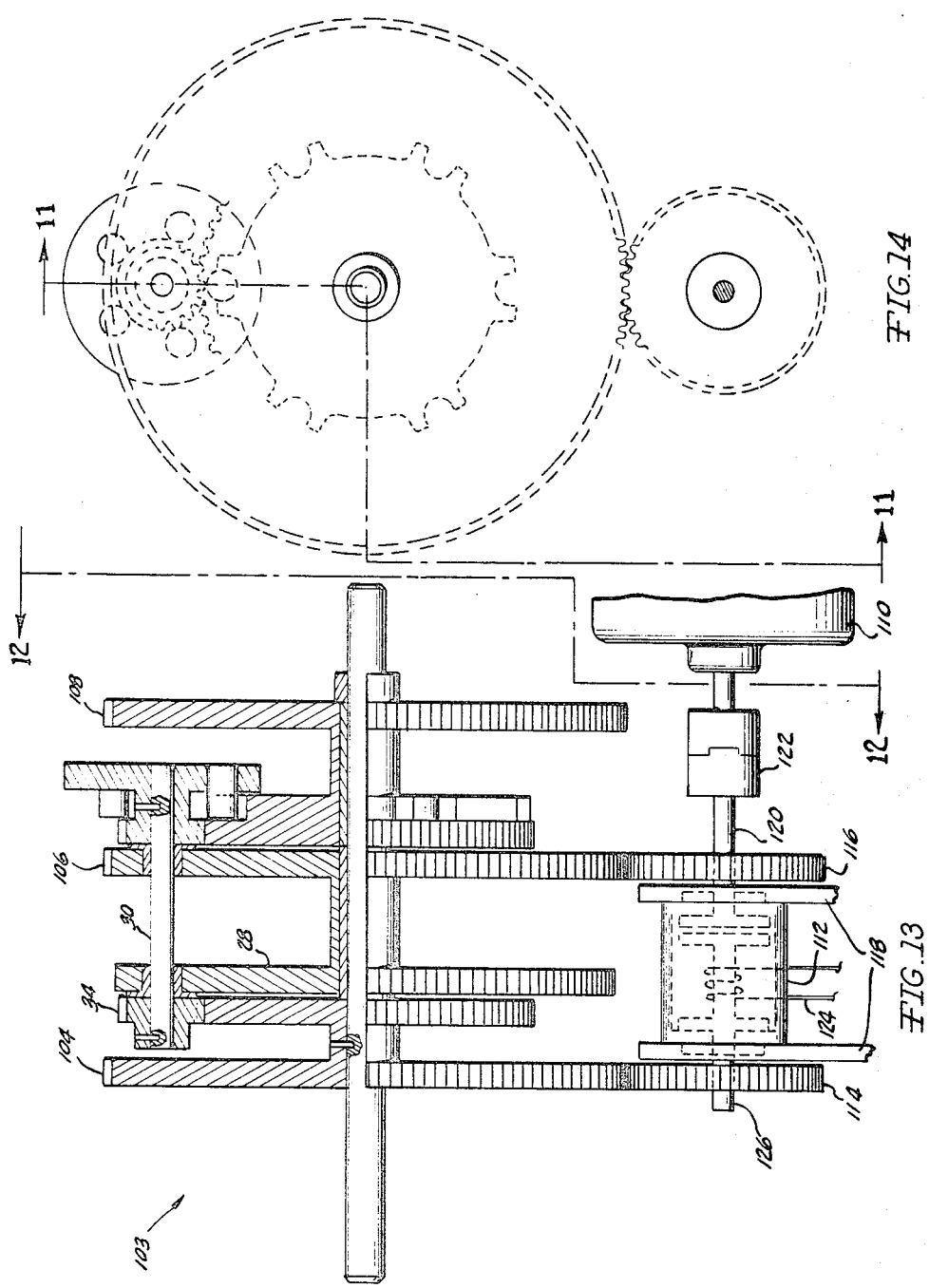

United States Patent Office 3,408,877
Patented Nov. 5, 1968

3,408,877
INTERMITTENT MOTION MECHANISM
Herbert H. Olson, Jackson, Mich., assignor to Hayes-Albion Corporation (formerly known as Hayes Industries, Inc.), Jackson, Mich., a corporation of Michigan
Filed Oct. 22, 1965, Ser. No. 502,146
19 Claims. (Cl. 74—84)

ABSTRACT OF THE DISCLOSURE

Apparatus having a gear train including a mutilated gear and an associated driving pin which is rotated on a trochoid curve either around the axis of a driven member for generating rotary intermittent motion, or in reference to a straight line when the driven member is a rack for generating intermittent linear motion.

---

The present invention relates to intermittent motion mechanisms which are adapted for use in applications requiring either high or low speed displacement of either small or medium magnitude.

It is an object of the present invention to provide an improved intermittent motion mechanism which is constructed and arranged so that it can generate small displacements directly from an input member to an output member and wherein smooth acceleration and deceleration of the output member is realized.

It is still another object of the present invention to provide an improved intermittent motion mechanism which is constructed and arranged so that it can readily be adapted for generating a wide range of indexes for a single revolution of an input shaft.

It is another object of the present invention to provide an improved intermittent motion mechanism which is constructed and arranged to generate linear intermittent motion from linear motion of an input member.

It is still another object of the present invention to provide an intermittent motion mechanism which is constructed and arranged so that the output member is locked by gearing into the mechanism at dwell periods, thereby minimizing the friction of the mechanism and eliminating oscillating forces that might otherwise occur.

It is still another object of the present invention to provide an intermittent motion mechanism of the foregoing character which employs star wheels and pin wheels for obtaining intermittent motion and which is constructed and arranged so that the star wheels and pin wheels can readily be changed without changing shaft centers for providing a large number of combinations of indexes and dwells.

It is still another object of the present invention to provide an improved intermittent motion mechanism of the foregoing character which has pins which enter and exit from the slots of the star wheel in a manner to provide optimum smooth reliable transition between dwell and index steps.

It is still another object of the present invention to provide an improved intermittent motion mechanism which is constructed and arranged so that separate synchronizing means are not required for smoothly engaging and disengaging of gears during engagement and disengagement of mutilated gears of the mechanism.

It is still another object of the present invention to provide an intermittent motion mechanism which is characterized by the large numbers of indexes per revolution of an input shaft that can be produced.

It is still another object of the present invention to provide an intermittent motion mechanism which is characterized by a construction and arrangement that lends itself to minaturization without sacrificing its capabilities.

Other objects of this invention will appear in the following description and appened claims, reference being had to the accompanying drawings forming a part of this specification wherein like reference characters designate corresponding parts in the several views.

In the drawings:

FIGURE 1 is a side elevational view, taken partly in section on the line 1—1 of FIG. 2, illustrating one form of an intermittent motion mechanism embodying the present invention;

FIGURE 2 is an end elevational view of the embodiment illustrated in FIG. 1, with portions removed for the purpose of more clearly illustrating the invention;

FIGURE 7 is a side elevational view, taken partly in section on the line 7—7 of FIG. 8, illustrating another form of an intermittent motion mechanism embodying the present invention;

FIGURE 8 is an end elevational view of the embodiment shown in FIG. 7, with portions removed for better illustrating the embodiment;

FIGURE 13 is a side elevation view, taken partly in section on line 13—13 of FIG. 14, illustrating still another form of an intermittent motion mechanism embodying the present invention; and FIGURE 14 is a schematic end elevational view taken on the line 14—14 of FIG. 13.

Figure 11:
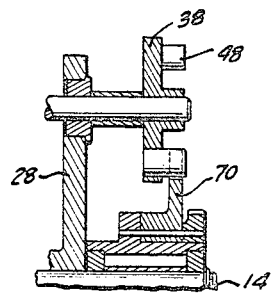
FIGURE 11 is a fragmentary side elevation view taken on the line 11—11 of FIG. 12, illustrating another form of the intermittent motion mechanism embodying the present invention.

Before explaining the present invention in detail, it is to be understood that the invention is capable of other embodiments and of being practiced or carried out in various ways. It is also to be understood that the phraseology or terminology employed herein is for the purpose of description and not of limitation.

The general concept of the present invention is based in part on the use of a driving pin that is rotated on a trochoid curve around the axis of rotation of a driven member for generating rotary intermittent motion, and also on the use of a driving pin that is rotated on a trochoid curve in reference to a straight line for generating intermittent linear motion.

Various arrangements can be employed for carrying out the present invention, and the first arrangement that will be described of a mechanism embodying this general concept is shown in FIGS. 1 and 2. As there shown, an intermittent motion mechanism 10 is shown in which an input gear or member 12 is fastened to the input shaft 14. The latter extends through the length of the mechanism 10 and serves as a basic pivotal support for all the rotating members. An end bearing support 16 is fastened to an external normally stationary support member 18. The end bearing support 16 holds bearings 20 at one end of the input shaft 14 and similar bearings 22 are supported suitably at the other end, allowing shaft 14 to rotate freely. A stationary sun gear 24 is fastened to the end bearing support 16 and is located concentric with the input shaft 14. The sun gear 24 has a clearance hole at its center so that the input shaft rotates freely with respect to it. A rotary gear assembly 26 is provided which includes a rotary support member 28 which is fastened to rotate the input shaft 14 and supports shaft 30 by means of bearings 32. Two identical gears 34 and 36, and a pin wheel 38 are fastened to shaft 30 to rotate together. Pinion gear 34 meshes with sun gear 24 and rotates as a planetary or epicycloid gear around the sun gear whenever the input shaft 14 is rotated. Gear 36 and pin wheel 38 therefore rotate in a like manner around a mutilated gear 40 and slotted Geneva type or star wheel 42. The mutilated gear 40, slotted drive plate or star wheel 42 and an output gear or member 44 are all fastened together and rotate on bearings 22 which are supported on the input shaft 14. The slotted star wheel 42 has six short slots 46 at its outer diameter aligned radially and placed at equal angles around the periphery of the wheel. The slots 46 are of a size to allow a pin 48 in the pin wheel 38 to slide freely in them. The diameter of the slotted star wheel is equal to the pitch diameter of the mutilated gear 40. The mutilated gear 40 is of the same pitch and has the same pitch diameter as sun gear 24. Six sectors 50 of the mutilated gear 40 have a number of teeth removed (in this case, five), and each such sector is equally spaced from each other around the pitch circle of the gear. The slotted star wheel 42 is located in reference to the mutilated gear 40 such that the centerline of the six slots coincide with the centerline of the six sectors 50 without teeth. Pin wheel 38 has five pins or cam followers 48 projecting outward and parallel to shaft 30, which will engage the slot star wheel 42. The five pins 48 are equally spaced about a circle 52 which must be larger than the pitch diameter of gear 36. Circle 52 is predetermined by design to impart a motion to each pin such that the center of each pin 48 describes a trochoid curve when the input shaft 14 is rotated. This curve forms a loop as the pin 48 approaches and leaves its innermost position, and a typical loop is designated by 54 in FIG. 2. The loop 54 intersects the pitch circle 56 of mutilated gear 40 at two points 58 and 60, when it is also tangent to two radial lines drawn from the center of rotation of the slotted star wheel. The distance along the pitch circle between the two points is equal to one circular pitch of mutilated gear 40 (and also equal to one circular pitch of sun gear 24).

From the foregoing description it will be understood by those skilled in the art that when a pin 48 engages a slot 46 of the star wheel 42 as the pin crosses into the pitch circle 56, it imparts no motion to the star wheel 42. As the pin 48 rotates through the loop 54, it accelerates and decelerates the star wheel 42 in a smooth action until the pin 48 again crosses the pitch circle 56 when the star wheel stops. It has been rotated one tooth position from its former position.

Again referring to the motion of gear 36 and pin wheel 38, when the input shaft 14 is rotated, gear 36 and pin wheel 38 alternately engage and disengage the mutilated gear 40 and star wheel 42 respectively. When gear 36 meshes with the mutilated gear 40, the output of the mechanism 10 is stationary whether input shaft 14 is rotated or not. When gear 36 arrives at a sector 50 of the mutilated gear 40 with no teeth, a pin 48 on pin wheel 38 engages a slot 46 of the star wheel 42 and for a small continuing rotation of the input shaft 14, both the gear 36 and pin wheel 38 are engaged with their corresponding members. Further rotation of input shaft 14 and the pin 48 causes the star wheel 42 to rotate in a direction opposite to the rotation of the input shaft 14, and gear 36 is then free of gear 40. Continued rotation moves the star wheel 42 and the mutilated gear 40 one tooth position from the former position. The teeth of the mutilated gear 40 are now in a position to mesh again with gear 36 as gear 36 rotates into the tooth area of the mutilated gear 40. Again, during the transition period, the star wheel is stationary and both the gear 36 and pin wheel 38 are engaged with their corresponding members. Further rotation causes the pin 48 to become disengaged from the star wheel 42 and gears 36 and 40 again become fully meshed.

Figure 3:
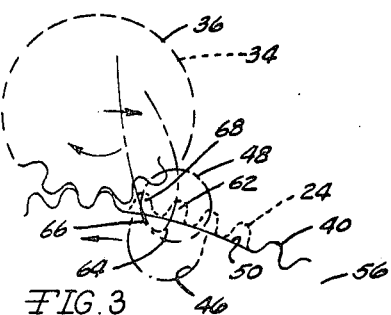
FIGURES 3, 4, 5 and 6 are fragmentary schematic views showing a portion of the intermittent motion mechanism of FIG. 1 in different stages of its movement.
Figure 4:
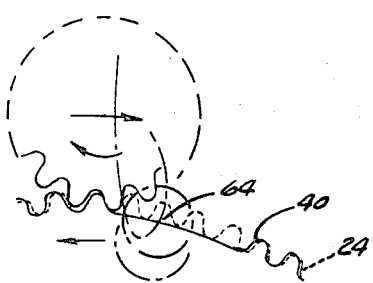
Figure 5:
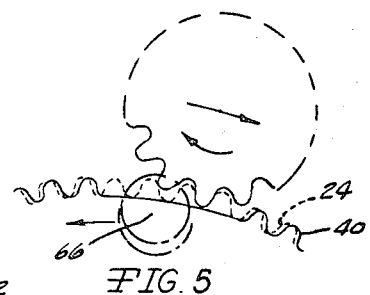
Figure 6:
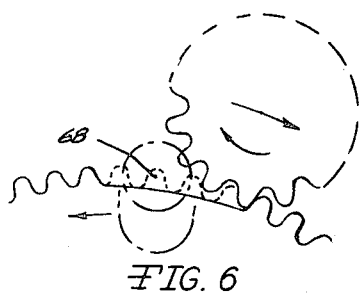

A detailed sequence of events of an indexing operation are shown in FIGS. 3, 4, 5 and 6 to which reference is now made. FIG. 3 represents the position of the relevant members when the end of a dwell period is reached and an index motion is impending. The center of the driving pin 48 crossing the pitch circle 56 is at point 62 on the trochoid curve. Gear 36 is still engaged with mutilated gear 40 and the pin 48 has entered a slot 46. Further rotation, as shown in FIG. 4, advances the center of the pin 48 to point 64 on the curve. The displacement of the mutilated gear 40 is evident by the relationship of its teeth (solid outline) with those of sun gear 24 (dotted outline). Further rotation is represented by FIG. 5 when the center of the pin 48 is at point 66 on the curve. At the completion of the index as shown in FIG. 6 in the center of the pin 68 is again at the pitch circle represented by point 68 on the trochoid curve. The teeth of gears 40 and 24 are now aligned and gear 36 again engages the teeth of mutilated gear 40.

The arrangement described provides six indexes of six degrees each and six dwells for a 324° revolution of the input shaft 14. By changing the associated mutilated gear star wheel, a different combination of six degree indexes with dwell periods can be provided. For instance, a one slot star wheel aligned to a mutilated gear with one sector of five teeth removed will provide one index of six degrees and one dwell for a 354° revolution of the input shaft. If both the pin wheel and the associated mutilated gear star wheel are changed, indexes of a different displacement can be combined with dwell periods in other combinations. Thus, the substitution of the pin wheel with a larger pin circle and associated mutilated gear star wheel can be used to provide three 12° indexes and three dwells for a 324° revolution of the input shaft.

Figure 12:
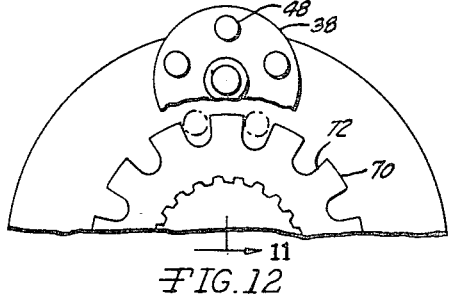
FIGURE 12 is a fragmentary end elevation view of the embodiment illustrated in FIG. 11.

FIGS. 11 and 12 show the substitution of a slotted drive plate or star wheel 70 with no mutilated gear 40, and therefore, no mating gear 36 in the mechanism. One revolution of the input shaft 14 produces twenty indexes of six degrees and twenty dwells at the output. The star wheel 70 is driven as previously described except each pin 48 in turn engages the slots 72 as they rotate in to their innermost position. The characteristic as mentioned before, in which the pin wheel 38 can rotate through a small angle at the beginning and end of the index motion without imparting motion to the star wheel 70, allows the next pin to enter a slot before the preceding pin has left its slot, to smoothly drive the slotted wheel 70 without it becoming disengaged.

The same principle of operation of generating intermittent motion applies to an arrangement as represented by FIGS. 7 and 8 where the sun gear is replaced by an internal ring gear 74 and the mutilated gear is replaced by internal mutilated gear 76 and the star wheel is replaced by an internal slotted drive plate or star wheel 78. The basic generating motion is hypocycloidal rather than epicycloidal. The internal gear 74 is fastened in a similar manner to an end bearing support 80 so as to be stationary. The number of teeth removed from the mutilated gear 76 is increased for the same index angle as compared to the external gear arrangement of FIG. 1, because of the geometry of the gear mesh. This arrangement has an advantage of reducing space required for the mechanism.

The rotary arrangements such as are described above can easily be dynamically balanced for high speed operation. An identical sub-assembly to that rotating on bearings 32 can be placed 180° from shaft 30 at 81 in FIG. 1. This also reduces the forces acting on each pin and slot resulting in less wear and friction.

Figure 9:
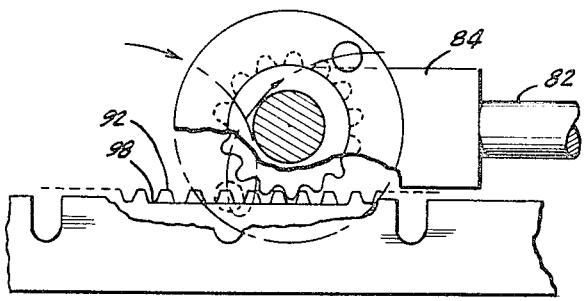
FIGURE 9 is a fragmentary side elevational view with portions removed, illustrating still another form of an intermittent motion mechanism embodying the present invention.
Figure 10:
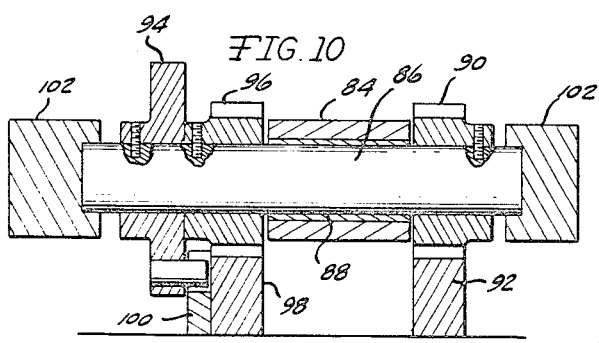
FIGURE 10 is a transverse vertical section of the embodiment illustrated in FIG. 9.

FIGS. 9 and 10 show the application of the basic principle to produce linear intermittent motion from linear motion. A means of producing linear motion such as a hydraulic cylinder assembly 82 is connected to the mechanism by means of block 84 which supports a shaft 86 through bearings 88. At one end of the shaft 86, pinion gear 90 is pinned and engages stationary rack 92. At the other end of the shaft 86 are pinned a pin wheel 94 and a pinion gear 96 identical to gear 90. A mutilated rack 98 and drive plate or slotted member 100 fastened together are arranged to be engaged alternately with gear 96 and pin wheel 94 respectively when the block 84 is moved along a straight line. Thus, a constant linear motion imposed on the block 84 will produce an intermittent linear motion of the mutilated rack 98 and slotted member 100. Bearings such as at 102 keep the gears 96 and 98, and 90 and 92 engaged, and a work holding device (not shown) normally would be fastened to the output members 98 and 100. The similarity between this arrangement of FIGS. 9 and 10 and the one in FIGS. 1 and 2 will be understood by those skilled in the art when it is considered that the stationary rack 92 corresponds to the sun gear 24; gears 90, 96 and pin wheel 94 correspond to gears 34 and 36 and pin wheel 38, thus forming in effect a rotary gear assembly; and mutilated rack 98 and slotted member 100 correspond to mutilated gear 40 and star wheel 42. This arrangement will also operate in a less precise manner using sprockets and chains in place of the gears and racks.

A simple and practical arrangement of this invention is shown in the embodiment of the intermittent motion mechanism 103 shown in FIGS. 13 and 14 and which resembles a mechanical differential in operation as well as appearance. As there shown, gears 104 and 106 are input gears or members and gear 108 is an output gear or member. When gear 104 is held stationary and input gear 106 is rotated, output gear 108 will be rotated intermittently in the same manner of operation as was described in connection with the mechanism of FIG. 1. The direction of rotation of gear 108 during index is opposite to that of the input gear 106. If gears 104 and 106 are rotated at the same speed and direction, the output gear 108 will rotate at the same speed and direction without intermittent motion. Thus, the mechanism 103 can be implemented to provide a drive unit that is capable of two modes of operation: a slewing mode and an intermittent mode. A drive unit of this type has utility in positioning applications in which coarse positioning is accomplished at the higher speeds of the slewing mode and fine positioning is done at the intermittent mode. Such a drive unit can be adapted to drive various work positioning systems used in machine tools or transfer equipment.

A typical means of implementation is represented schematically with a motor 110, a clutch-brake 112 and gears 114 and 116 which mesh with input gears 104 and 106 respectively. The clutch-brake 112 is a type that is available in various sizes and designs and is well known in the art. The housing of the clutch-brake is fastened to a stationary member 118. The input shaft 120 is connected to the motor shaft by means of a coupling 122. Gear 116 is fastened to the input shaft 120 which rotates free of the clutch-brake 112 when the coil 124 is not energized. Input gear 106 is always connected to the motor. The output shaft 126 of the clutch-brake 112 is engaged to the housing when the coil 124 is not energized. Gear 114 is fastened to the output shaft 126 and therefore input gear 104 is locked to the stationary clutch-brake housing when the coil 124 is not energized. When coil 124 is energized, output shaft 114 is connetced to the input shaft 120 and is free of the housing so both gears 104 and 106 are connected to the motor 110 and rotate together to provide the slewing mode. In operation, a typical procedure is to energize coil 124 and the motor 110 to drive both gears 104 and 106 until the output of the mechanism 103 drives a work positioning device (not shown) to an approximate position, when the motor 110 stops and coil 124 is de-energized. The motor 110 is then reversed and drives gear 106 until the workpiece (not shown) is precisely positioned by intermittent motion.

When using small precision gears in the arrangement of FIGS. 13 and 14, the mechanism 103 is compatible in size with servo-mechanism components and can be supported between two gear plates of a conventional gear train package. The mechanism 103 could also provide a drive unit between a servo-motor and a rotary electrical device to serve as a speed reducer eliminating long gear trains.

Having thus described my invention, I claim:

1. An intermittent motion mechanism comprising a normally stationary sun gear, a rotary mutilated gear coaxially disposed relative to said sun gear, a star wheel coaxially fixed to said mutilated gear for rotation therewith and having radial slots axially aligned with the mutilated segments of the mutilated gear, a planetary gear assembly including rotary axially aligned planetary gears and a pin wheel, said planetary gears being in mesh with said sun gear and said mutilated gear, said pin wheel having pins for entering the radial slots and drivingly engaging said star wheel for imparting intermittent movement to the star wheel when the planetary gears travel past said mutilated segments, rotary input member for rotating said planetary gear assembly, and a rotary output member connected to said star wheel for transmitting the intermittent movement of said star wheel.

2. An intermittent motion mechanism comprising a normally stationary internal ring gear, a rotary mutilated internal ring gear coaxially disposed relative to said stationary gear, an internal star wheel coaxially fixed to said mutilated gear for rotation therewith and having radial slots axially aligned with the mutilated segments of the mutilated gear, a planetary gear assembly including rotary axially aligned planetary gears and a pin wheel, said planetary gears being in mesh with said stationary gear and said mutilated gear, said pin wheel having pins for entering the radial slots and drivingly engaging said star wheel for imparting intermittent movement to the star wheel when the planetary gears travel past said mutilated segments, a rotary input member for rotating said planetary gear assembly, and a rotary output member connected to said star wheel for transmitting the intermittent movement of said star wheel.

3. An intermittent motion mechanism comprising a normally stationary rack, a mutilated rack longitudinally movable parallel to said stationary rack and having an integral Geneva-type slotted portion parallel to the mutilated rack teeth, the slots in said portion being aligned with the mutilated portions of said mutilated rack, a pinion gear assembly including rotary axially aligned pinion gears and a pin wheel supported for linear movement and relative to said racks, said pinion gears being in mesh with said stationary rack and said mutilated rack, said pin wheel having pins for entering the slots and drivingly engaging said slotted portion for imparting relative intermittent movement to said slotted portion when the pinion gears travel past said mutilated portions and means for imparting relative linear movement between said pinion gear assembly and said stationary rack.

4. An intermittent motion mechanism comprising a normally stationary sun gear, a rotary star wheel coaxially aligned with said sun gear and having a plurality of radial slots, a planetary gear assembly including at least one set of an axially aligned planetary gear and a pin wheel mounted for corotation, each said planetary gear being in mesh with said sun gear, each said pin wheel having pins for entering the radial slots and drivingly engaging said star wheel for imparting intermittent movement to the star wheel when the planetary gear orbits on said sun gear, a rotary input member for rotating said planetary gear assembly, and a rotary output member connected to said star wheel for transmitting the intermittent movement inparted thereto.

5. An intermittent motion mechanism comprising a normally stationary gear, a rotary mutilated gear coaxially disposed relative to said stationary gear, a star wheel coaxially fixed to said mutilated gear for rotation therewith and having radial slots axially aligned with the mutilated segments of the mutilated gear, a planetary gear assembly including rotary axially aligned planetary gears and a pin wheel, said planetary gears being in mesh with said stationary gear and said mutilated gear, said pin wheel having pins for entering the radial slots and drivingly engaging said star wheel for imparting intermittent movement to the star wheel when the planetary gears travel past said mutilated segments, a rotary input member for rotating said planetary gear assembly and normally stationary sun gear for imparting continuous movement to the star wheel, and a rotary output member connected to said star wheel for transmitting the movements imparted to the star wheel.

6. An intermittent motion mechanism comprising a full tooth gear, a mutilated gear, a rotary gear assembly rotatable in mesh with the teeth of said full tooth gear and said mutilated gear and including a pin wheel having a plurality of pins for alignment with the mutilated segments of said mutilated gear, a drive plate fixed for movement with said mutilated gear and having means drivingly engageable by said pins for moving the mutilated gear relative to the full tooth gear a predetermined amount when the teeth of said mutilated gear are out of mesh with said rotary gear assembly.

7. An intermittent motion mechanism comprising a full tooth gear, a drive plate movable in a plane parallel to said full tooth gear and having spaced slots in a surface corresponding to the tooth surface of said full tooth gear, a rotary gear assembly including a rotatable gear mesh with said full tooth gear and a pin wheel fixed to rotate with the rotatable gear, said pin wheel having a plurality of pins for engaging said driving plate in the slotted portions thereof for effecting intermittent movement of the plate relative to the full tooth gear when said rotary gear assembly travels on said full tooth gear.

8. An intermittent motion mechanism comprising a sun gear, a mutilated gear movable in a plane parallel to said sun gear, a rotary gear assembly rotatable in mesh with the teeth of said sun gear and said mutilated gear and including at least one planet gear in mesh with said sun gear and a pin wheel having at least one pin for alignment with the mutilated segment of said mutilated gear, a drive plate fixed for movement with said mutilated gear and having means drivingly engageable by said pin for moving the mutilated gear relative to the sun gear a predetermined amount when the mutilated segment of said mutilated gear is out of mesh with said rotary gear assembly.

9. An intermittent motion mechanism comprising an internal ring gear, a mutilated gear movable in a plane parallel to said internal ring gear, a rotary gear assembly rotatable in mesh with the teeth of said internal ring gear and said mutilated gear and including at least one planet gear in mesh with said internal ring gear and a pin wheel having at least one pin for alignment with the mutilated segment of said mutilated gear, a drive plate fixed for movement with said mutilated gear and having means drivingly engageable by said pin for moving the mutilated gear relative to the internal ring gear a predetermined amount when the mutilated segment of said mutilated gear is out of mesh with said rotary gear assembly.

10. An intermittent motion mechanism comprising a rack, a mutilated gear movable in a plane parallel to said rack, a rotary gear assembly rotatable in mesh with the teeth of said rack and said mutilated gear and including at least one pinion in mesh with said rack and a pin wheel having at least one pin for alignment with the mutilated segment of said mutilated gear, a drive plate fixed for movement with said mutilated gear and having means drivingly engageable by said pin for moving the mutilated gear relative to the rack a predetermined amount when the mutilated segment of said mutilated gear is out of mesh with said rotary gear assembly.

11. An intermittent motion mechanism comprising a normally stationary gear, a mutilated gear movable in a plane parallel to said stationary gear, a rotary gear assembly rotatable in mesh with the teeth of said stationary gear and said mutilated gear and including a pin wheel having at least one pin for alignment with the mutilated segment of said mutilated gear, a drive plate fixed for movement with said mutilated gear and having means drivingly engageable by said pin for moving the mutilated gear relative to the stationary gear a predetermined amount when the mutilated segment of said mutilated gear is out of mesh with said rotary gear assembly, said stationary gear being optionally movable with said rotary gear assembly to effect continuous movement of said drive plate.

12. An intermittent motion mechanism comprising a sun gear, a drive plate movable parallel to said sun gear and having spaced slots in a surface corresponding to the tooth surface of said sun gear, a rotary gear assembly including at least one planet gear in mesh with said sun gear and a pin wheel fixed to rotate with said planet gear, said pin wheel having at least one pin for engaging said driving plate in the slotted portions thereof for intermittently moving the plate when said rotary gear assembly travels on said sun gear.

13. An intermittent motion mechanism comprising an internal ring gear, a drive plate movable in a plane, parallel to said internal ring gear and having spaced slots in a surface corresponding to the tooth surface of said internal ring gear, a rotary gear assembly including at least one planet gear in mesh with said internal ring gear and a pin wheel fixed to rotate with the planet gear, said pin wheel having at least one pin for engaging said driving plate in the slotted portions thereof for intermittently moving the plate when said rotary gear assembly travels on said internal ring gear.

14. An intermittent motion mechanism comprising a stationary gear, a drive plate movable in a plane parallel to said stationary gear and having spaced slots in a surface corresponding to the tooth surface of said stationary gear, a rotary gear assembly including a rotatable gear in mesh with said stationary gear and a pin wheel fixed to rotate with the rotatable gear, said pin wheel having at least one pin for engaging said driving plate in the slotted portions thereof for intermittently moving the plate when said rotary gear assembly travels on said stationary gear, said internal ring gear being optionally movable with said rotary gear assembly to effect continuous movement of said drive plate.

15. An intermittent motion mechanism comprising a full tooth gear, a mutilated gear, a rotary gear assembly relatively rotatable with respect to said full tooth and mutilated gears and in mesh with the teeth thereof and including a pin wheel having at least one pin for alignment respectively with mutiliated segments of said mutilated gear, a plate fixed for movement with said mutilated gear and having means engageable with said pin when the latter is in alignment with one of said mutilated segments for effecting a driving connection between the pin wheel and the mutilated gear so as to effect relative turning of a predetermined amount between said full tooth gear and the mutilated gear when the teeth of the mutilated gear are out of mesh with said rotary gear assembly.

16. An intermittent motion mechanism according to claim 15, wherein said rotary gear assembly has an input member fixed thereto for rotation therewith.

17. An intermittent motion mechanism according to claim 15, wherein an output member is fixed to said plate and mutilated gear for rotation therewith.

18. An intermittent motion mechanism according to claim 15, wherein said rotary gear assembly has an input gear fixed thereto for rotation therewith, and an output member is fixed to said plate and mutilated gear for rotation therewith.

19. A motion imparting mechanism comprising a drive member moving in a trochoid path, a driven member engaged by said drive member at the loop of said path to advance said driven member the width of said loop, and means for holding said driven member against movement after said driven member has moved the width of the loop of said path.

References Cited
UNITED STATES PATENTS

| | | | |
|---|---|---|---|
| 1,846,785 | 2/1932 | Breitling | 74—435 X |
| 2,040,933 | 5/1936 | Gillen | 74—415 X |
| 3,057,215 | 10/1962 | Stewart | 74—84 X |
| 3,059,360 | 10/1962 | Krauskopf | 74—84 |

C. J. HUSAR, *Primary Examiner.*

UNITED STATES PATENT OFFICE
CERTIFICATE OF CORRECTION

Patent No. 3,408,877                          November 5, 1968

Herbert H. Olson

It is certified that error appears in the above identified patent and that said Letters Patent are hereby corrected as shown below:

Column 1, line 72, "minaturization" should read -- miniaturization --. Column 2, lines 34 and 36, "elevation", each occurrence, should read -- elevational --. Column 3, line 29, "slot" should read -- slotted --. Column 4, line 17, after "FIG. 6" cancel "in"; line 18, "pin 68" should read -- pin 48 --. Column 7, line 13, after "normally" insert -- for selectively simultaneously rotating therewith said --; line 33, before "mesh" insert -- in --. Column 8, line 29, "plane" should read -- plane, --.

Signed and sealed this 10th day of March 1970.

(SEAL)
Attest:

Edward M. Fletcher, Jr.
Attesting Officer

WILLIAM E. SCHUYLER, JR.
Commissioner of Patents